SOLID STATE SCANNER FOR A REMOTE METER READING SYSTEM

Filed July 22, 1971 4 Sheets-Sheet 1

Inventor,
Richard G. Farnsworth,
by Vale P. Myles
His Attorney.

SOLID STATE SCANNER FOR A REMOTE METER READING SYSTEM

Filed July 22, 1971 4 Sneets-Sheet 2

Inventor,
Richard G. Farnsworth,
by Vale P. Myles
His Attorney.

SOLID STATE SCANNER FOR A REMOTE METER READING SYSTEM

Filed July 22, 1971 4 Sheets-Sheet 3

Inventor,
Richard G. Farnsworth,
by Vale P. Myles
His Attorney.

SOLID STATE SCANNER FOR A REMOTE METER READING SYSTEM

Filed July 22, 1971

Inventor,
Richard G. Farnsworth,
by Vale P. Myles
His Attorney.

United States Patent Office 3,706,086

Patented Dec. 12, 1972

3,706,086

SOLID STATE SCANNER FOR A REMOTE METER READING SYSTEM

Richard G. Farnsworth, York, Maine, assignor to General Electric Company

Filed July 22, 1971, Ser. No. 165,279

Int. Cl. G08c *15/00, 19/16*

U.S. Cl. 340—180 7 Claims

ABSTRACT OF THE DISCLOSURE

An electronic scanner for a remote meter reading system, comprising, a plurality of gating devices each controlled by a counter and each adapted to sequentially connect individual meter monitoring data sources at a remote station to a remote station transmitter in response to a control signal from a central station. The electronic scanner further comprises a reset unit which is operated in response to the control signal to set the counter into a predetermined state such that the electronic scanner always begins operation with a predetermined data source.

BACKGROUND OF THE INVENTION

There is a desire on the part of many modern utility companies to find a fast, economical and reliable means of reading a plurality of meters that are in operation at various remote locations on their distribution systems. In the past, readings of water, gas and electric meters in homes and apartment houses have normally been recorded manually, by sending a meter reader from building to building to make visual readings. This means of meter reading has several inherent disadvantages, such as; high labor costs, long delays in gathering some individual readings, and an element of human error. To overcome these deficiencies in a commercially practical manner, some attempts have already been made to utilize readily available, in-place telephone systems to systematically collect at a central station, meter readings taken from a plurality of remote points. For example, in one prior art meter reading system utilizing a telephone system, an individual telephone transmitter is required at each meter. Thus, it is necessary in such a prior art system to employ a total of three telephone transmitters in order to obtain readings from gas, electric and water meters in one home. Obviously, the cost of so many transmitters represents a major drawback to commercial acceptance of such a system.

In another common type of prior art meter reading system, a mechanical scanner comprising a motor-driven sweep arm is provided at each remote station to mechanically connect data output terminals from a plurality of meters such as gas, electric and water meters, to a common remote station telephone transmitter. This type of system may require that a synchronizing signal be sent from a central telephone station with an interrogation request signal in order to properly position the sweep arm of the mechanical remote station scanner on a first data output terminal. The necessary mechanical and electrical connections between the meters and the common remote station transmitter are, in such prior art arrangements, always subject to interruption due to contact bounce and are, therefore, not desirably reliable. In addition, precise positioning of a mechanical scanner sweep arm is subject to error due to motor drag or the mechanical inertia of the motor carrying the sweep arm past the intended data output terminal. A further disadvantage of this mechanical scanner system is the necessity of providing a large power supply at each remote station to drive the scanner motor.

In the present invention, a single request signal from a central station automatically sets an electronic scanner into a predetermined state to assure that the scanner will begin operation with a first data output terminal. Further, the scanner of the present invention electronically couples data output terminals to a remote station transmitter thereby eliminating the need for any mechanically rotatable sweep arm with its characteristic contact bounce, motor drag and positioning inaccuracies.

SUMMARY OF THE INVENTION

It is therefore an object of the present invention to provide a new and improved fast, economical and reliable means to electrically connect a plurality of data sources, such as meters, to a single data transmitter.

It is a further object of the present invention to provide a solid state electronic scanner for coupling data outputs from a plurality of meters to a single transmitter, which is controlled from a remote central station.

It is another object of this invention to provide an electronic scanner of modular construction for use with a remote meter reading system, in order to enable the scanner to be connected to a variety of different types of data encoders.

Yet another object of the invention is to provide an efficient and novel method of fixing identification of individual scanners located at various points on a remote meter reading system, remote from a central station.

Further objects and advantages of the invention will be apparent to those skilled in the art, from the following description of it, taken in conjunction with the attached drawings.

In one preferred form, the present invention comprises an electronic scanner in a meter reading system which, in response to a request signal from a central station, sequentially connects a plurality of meters to a remote station data transmitter. The electronic scanner includes a plurality of modular gates, each connected between a meter data encoder and the remote transmitter, and each responsive to a gating signal from a counter to connect a selected meter to the transmitter. The electronic scanner further includes a reset means responsive to a request signal from a central station to set the counter into a predetermined state and start a clock which generates a series of pulses into the counter. The pulses drive the counter to provide gating signals for turning on each gate one at a time. As the gates are turned on sequentially, data stored in each respective meter is communicated to the remote transmitter for transmission to the central station.

DESCRIPTION OF THE PREFERRED EMBODIMENTS

Overall system

Figure 1:
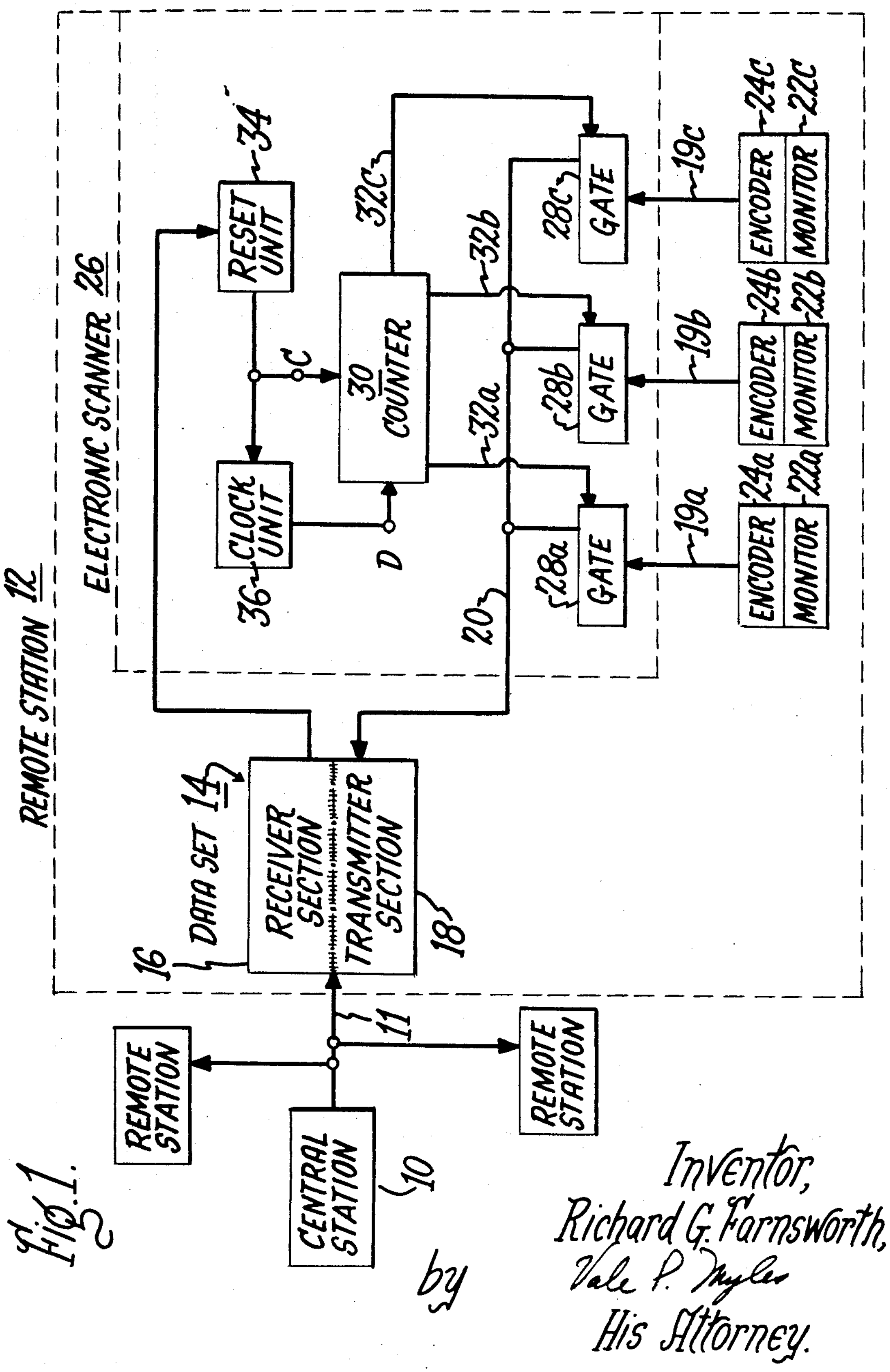
FIG. 1 is a block diagram of a remote meter reading system including an electronic scanner constructed pursuant to the teaching of the present invention.

Referring now to the drawings, FIG. 1 shows a remote meter reading system including a central station 10, which can selectively communicate with a plurality of separate, remotely positioned stations over a communication channel 11. Pursuant to the invention disclosed herein, central station 10 can request data selectively from each of the remote stations on the system. Such requested data can be representtive of meter readings, or the like, taken at each remote station. In addition to this request capability, the central station 10 is capable of receiving and recording the requested data from the remote stations. Each remote station on the system, such as, for example, remote station 12, comprises at least one data set 14 provided with a receiver section 16 for receiving a request signal from the central station 10, and a transmitter section 18 for transmitting data to the central station 10. Various types of conventional data sets are suitable to afford these functions, but in the preferred embodiment of the invention described herein, the data set 14, may be an "Experimental Residential Utility Meter Reading Data Set X406A (M12)," which is supplied by the American Telephone and Telegraph Company of New York, N.Y. It should also be understood that the communication channel 11 may be a portion of a conventional telephone system.

The remote station 12 employs a number of data gathering means or monitors **22*a*, 22*b* and 22*c* for measuring or minitoring a varying quantity, such as the amount of gas, electricity or water consumed in a home, and converting the monitored quantity into mechanical positional data such as may be shown by either a rotatable dial register or a pointer indicator. Each of the monitoring devices 22*a–c* has associated with it an analog-to-digital encoder 24*a–c*, respectively, which converts a measurement of the monitored quantity into a data signal suitable for transmission to and receipt by a transmitter section 18 of data set 14. A suitable encoder for this application is described in a co-pending application entitled, "Telemetering System Having a Continuously Monitoring Encoder," Ser. No. 1,609, filed Jan. 9, 1970, by Richard G. Farnsworth and James H. Keeler, Jr. and assigned to the assignee of the present invention, now Pat. No. 3,662,368, issued May 9, 1972. Of course, other encoders may be employed in the system disclosed herein in order to convert mechanical positional data from monitoring devices 22*a–c*** into suitable data form, such as a binary data form, without departing from the teaching of the invention.

The transmitter section 18 may either directly relay data received from the encoders **24*a–c* representative of the quantities measured by monitors 22*a–c*, or the transmitter section 18 may convert the data signals representative of the monitored quantities into a different preselected second form and transmit data signals in such second form to the central station 10. Each remote station 12 is further provided with an electronic scanner 26 that forms the essence of the present invention. The scanner 26 operates to connect each of the encoders 24*a–c*, one at a time, in a predetermined sequence, to the data set transmitter section 18 in response to a request signal initiated at the central station 10**.

The electronic scanner 26 shown in FIG. 1 is constructed in modular form to facilitate its interconnection with various different kinds of encoder units (**24*a–c*). These modules include a plurality of gating means 28*a*, 28*b* and 28*c*, each having an input terminal that is releasably connected, respectively, to one of the encoders 24*a–c*, by respective data input lines 19*a–c*. Each gating means 28*a–c* also has an output terminal connected to the transmitter section 18 of data set 14 by a common data output line 20. The gates 28*a–c* are controlled by gating signals that are generated by a counter means 30 on feeder lines 32*a*, 32*b* and 32*c*. Counter means 30 is controlled, in turn, by a reset unit 34 and a clock unit 36**.

As shown in FIG. 1, the output of reset unit 34 is connected both to the input of clock unit 36 and to counter means 30, at enabling terminal C. The input of reset unit 34 is connected to receiver section 16 of data set 14 for receiving signals therefrom. Thus, the reset unit 34 is capable of transmitting enabling signals to clock unit 36 and counter means 30 in response to receiving a signal from the receiver section 16. Clock unit 36 is connected to the input of counter 30 through a clock output terminal D.

As described thus far, the system illustrated in FIG. 1 would normally operate as follows: A pre-selected coded request signal would be sent by the central station 10 through the link 11 and received by one of the cooperatively coded data set receiver sections, such as the depicted section 16, at a selected remote station 12. This request signal is then relayed to the reset unit 34, either in the same form as received from the central station or in any desired form to which it may be converted by data set 14. Upon receipt of such a request signal, the reset unit 34 generates a first control signal that serves to lock the counter 30 into a preset state, in a manner that will be described in greater detail below. The reset unit 34 then operates to generate a second control signal which actuates clock unit 36 and causes the clock unit to begin sending a series of spaced pulses to counter 30, through clock output terminal D. This second control signal from reset unit 34 also operates to release the counter 30 from its locked preset state and enables the counter 30 to respond to the series of pulses from the clock unit 36. Accordingly, in response to the clock pulses from clock unit 36, the counter 30 generates a series of output gating pulses that are fed in a preselected sequence through output terminals **32*a–c*. Therefore, it can be seen that counter 30 begins operation in a predetermined state and such operation begins operation only after release by the reset unit 34 and upon receipt of a first pulse from clock unit 36**.

Starting from this predetermined state, the counter 30 transmits a first gating signal over output line **32*a* to gating means 28*a*, associated with encoder 24*a*, to cause a data signal from encoder 24*a* to be communicated through data input line 19*a*, gate 28*a* and data output line 20 to data set transmitter section 18. Each succeeding pulse from the clock unit 36 to the counter 30, through terminal D, causes the counter 30 to alternate between a reset state, wherein none of the gating means 28*a–c* are actuated, and a dating gathering state wherein a succeeding gating means associated with a succeeding encoder is actuated. Therefore, upon receipt of a request signal from central station 10 the electronic scanner 26 operates to automatically and sequentially connect a plurality of encoders 24*a–c* to a data set transmitter section 18 to enable data which is representative of the quantities monitored by monitors 22*a–c* to be transmitted to central station 10**.

An important feature of the present invention is the mode of operation of scanner 26, which has just been described. It will be observed that by providing a reset or spacing interlude between each successive gate-actuating pulse, the separate gates **24*a–c*** are completely shielded from one another; consequently, there is no risk of feedback, or inter-meter coupling, between the various gates. Thus, the accuracy and reliability of meter readings taken by the system are assured.

Reset unit

The reset unit 34, shown in the system of FIG. 1, will now be described in detail with reference to FIG. 2 of the drawings. In the preferred embodiment of the invention, reset unit 34 comprises a relay winding 40 which is connected to data set receiving section 16 and is actuated by a signal from data set receiving section 16 to close a switch 42 so that supply voltage is applied to bus lines 46*a* and 46*b* from a suitable source, such as a battery 44. Of course, a conventional direct current power supply of a type that converts 60 hertz AC power to DC power may be used in lieu of battery 44, if desired; and in some cases, sufficient power may be available from data set 14. Also, it is to be understood that any suitable switch, for example, an SCR or transistor, may be employed as a substitute for relay winding 40 and switch 42. It will also be apparent that the simple expedient of coupling power directly to the circuit, rather than to the relay shown in FIG. 2, could be used to eliminate relay 40, switch 42, and battery 44. Reset unit 34 further comprises an RC circuit formed of a resistor 48 and capacitor 50. Resistor 48 is connected at one end to line 46*a* and is connected at the other end to one end of capacitor 50, which has its other end connected to common line 52. Control gate 54 of SCR 56 is connected through a resistor 58 to a junction tie point B between resistor 48 and capacitor 50, and is biased through biasing resistor 60 connected between the gate 54 of SCR 56 and common line 52. The cathode anode path of SCR 56 is positioned in a forward direction between common line 52 and one side of a resistor 62, the other side of which resistor 62 is in turn connected to bus line 46*a*.

The base 64 of a transistor 66 is connected through a biasing resistor 68 to the junction of the anode of SCR 56 and resistor 62. The emitter 70 of transistor 66 is connected to bus line 46*b* and the collector 72 of transistor 66 is connected to the enabling terminal C as well as to common line 52 through a resistor 74. Bias for transistor 66 is also obtained through biasing resistor 76 which resistor is located between bus line 46*a* and bus line 46*b*.

Illustrative circuit values with a PNP transistor 66, type 2N3906, and an SCR 56, type C106, are:

Resistors 48 and 60—1000 ohms;
Resistors 62 and 74—2200 ohms;
Resistor 58—3300 ohms;
Resistor 68—22,000 ohms;
Resistor 76—15,000 ohms; and
Capacitor 50—10 microfarads The foregoing values are subject to reasonable variations as are known in the art and will be subject to variation when other types of transistors and SCR units are utilized to practice the invention.

Clock unit

Figure 2:
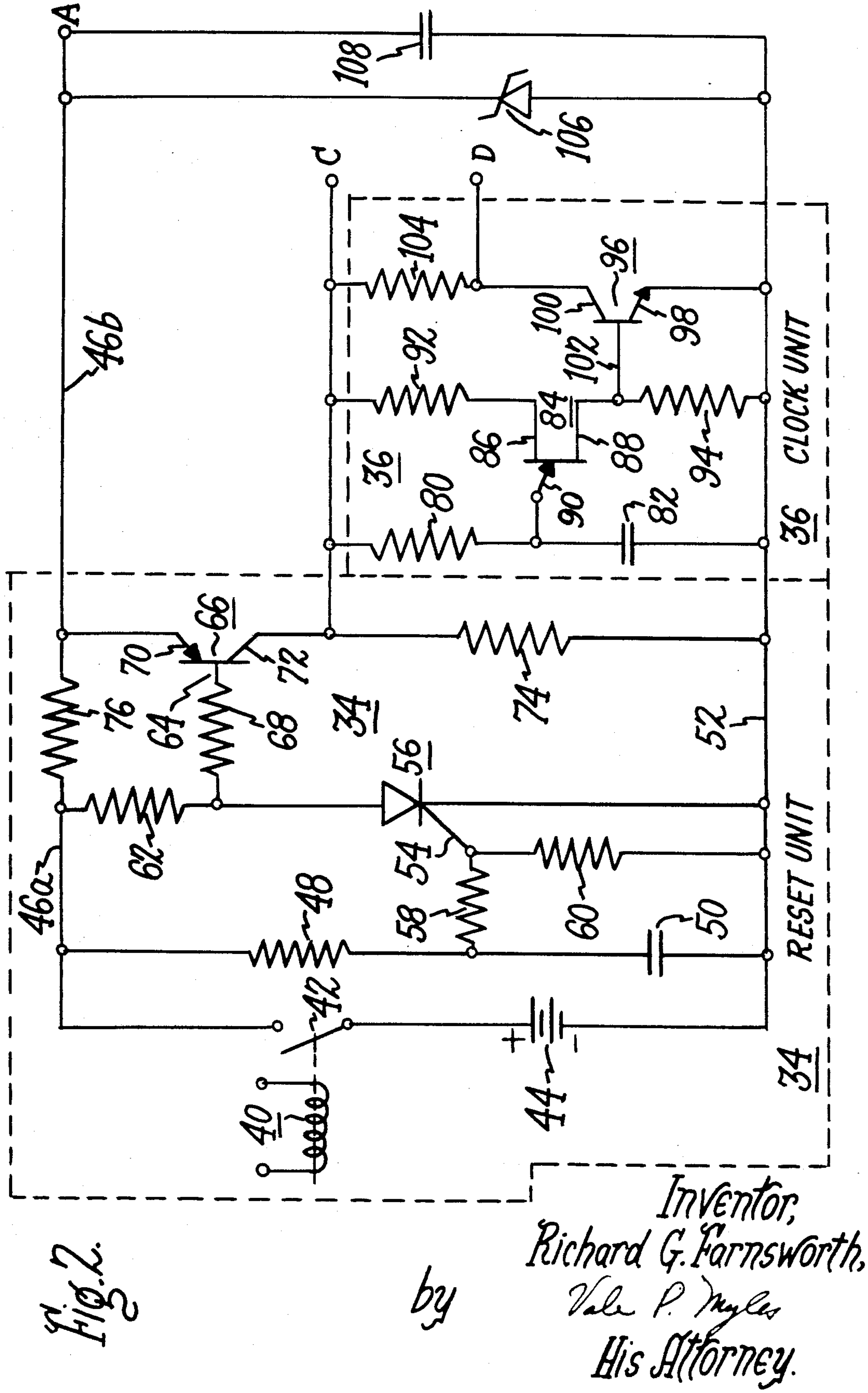
FIG. 2 is a schematic diagram of the clock and reset circuits of the electronic scanner illustrated in FIG. 1.

A suitable illustrative circuit for clock unit 36 is also shown in FIG. 2. In this preferred embodiment, clock unit 36 has an RC circuit comprising a resistor 80 and capacitor 82 connected together in series at junction point E and positioned with the other end of resistor 80 connected to the collector 72 of transistor 66. The other end of capacitor 82 is connected to common line 52. Unijunction transistor 84 having a first base 86, a second base 88, and emitter 90 has the emitter 90 connected to the junction point E. The first base 86 of unijunction transistor 84 is connected to enabling terminal C through resistor 92. Second base 88 of unijunction transistor 84 is connected to common line 52 through resistor 94. A transistor 96, having emitter 98, collector 100; and base 102, is positioned in the clock unit 36 with collector 100 connected to enabling terminal C through resistor 104. Emitter 98 of transistor 96 is connected directly to common line 52 and base 102 of transistor 96 is connected to the second base 88 of unijunction transistor 84. Clock unit output terminal D is connected directly to collector 100 of transistor 96.

A Zener diode 106 and capacitor 108 are connected in parallel across bus line 46*b* and common 52 to provide voltage regulation for the biasing voltage of electronic scanner 26 appearing at B+ supply terminal A on bus line 46*b*.

Typical circuit values of clock unit 36 with a unijunction transistor 84, Type 2N2840 and an NPN transistor 96, Type 2N3417, are:

Resistor 80—68,000 ohms;
Resistor 94—680 ohms;
Resistor 92—1500 ohms;
Resistor 104—2200 ohms;
Capacitor 82—5 microfarads;
Capacitor 108—100 microfarads; and
Zener diode 106—Type 1N705

One embodiment of counter and gates

Figure 3:
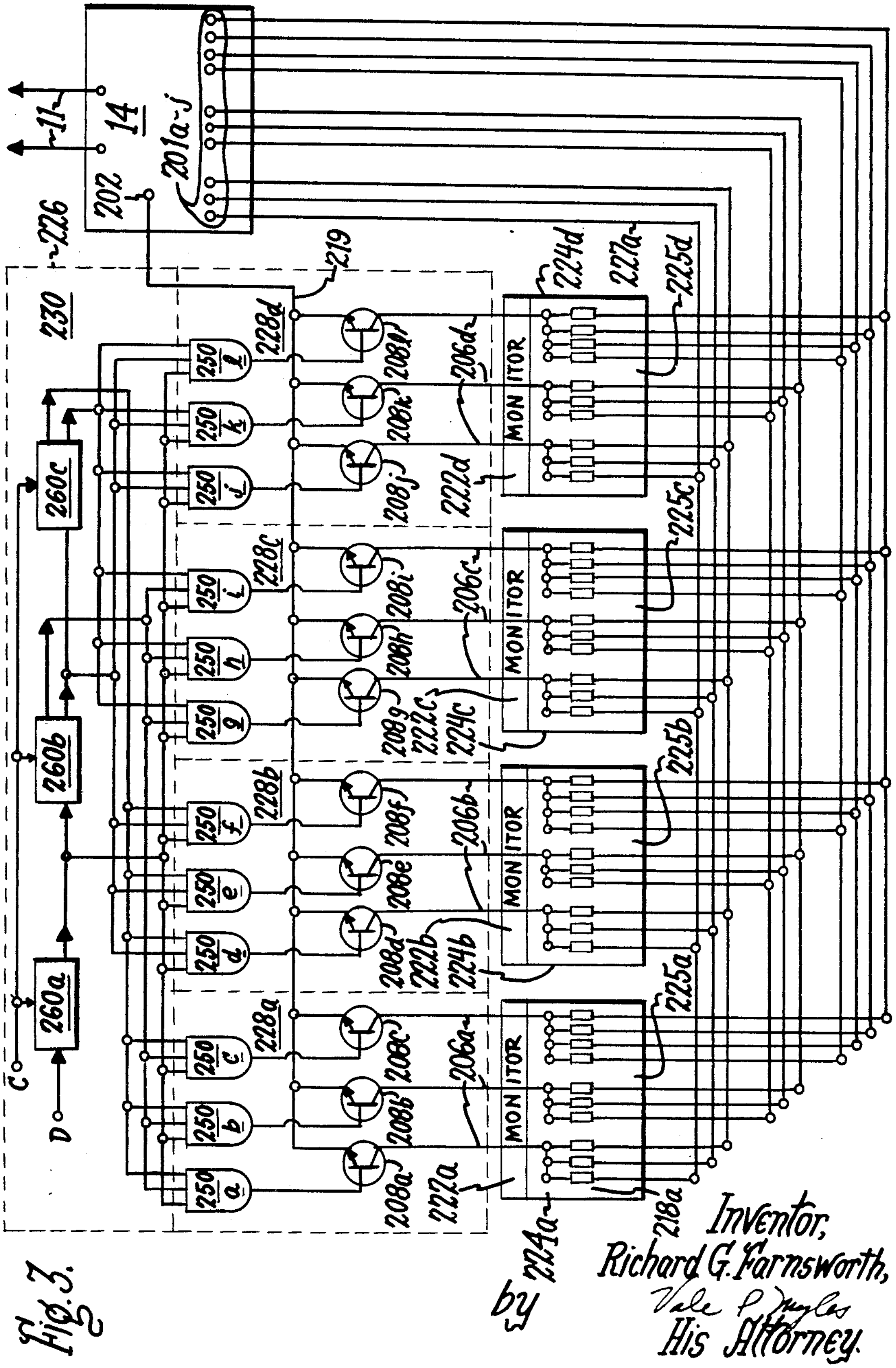
FIG. 3 is a schematic diagram of one embodiment of a counter and gates for an electronic scanner of the type illustrated in FIG. 1.

Referring to FIG. 3, a counter 230 and gates 228*a*, 228*b*, 228*c* and 228*d* of an electronic scanner 226 of the present invention are shown employed in an embodiment of the invention that differs slightly from the embodiment depicted in FIG. 1. Counter 230 corresponds to counter 30 of FIG. 1 and each of the gates 228*a–d* correspond, respectively, to one of the gating means 28*a–c* of FIG. 1. However, this embodiment discloses the employment of four gates as a matter of convenience, rather than only three gates, as was described with reference to FIG. 1. This modification illustrates that the modular construction of the present invention makes it possible to use various numbers of gates with the scanner 26, by simply paralleling one or more additional gates in the scanner 26, as shown, in order to accommodate additional meters, as desired.

Monitoring means 222*a*, 222*b*, 222*c* and 222*d* are employed for recording or monitoring a varying quantity such as gas, electricity, or water and converting the monitored quantity into mechanical positional data such as a pointer or dial register indication, in the manner described above with reference to the monitors 22*a–c* of FIG. 1. Each monitoring means 222*a–d* has associated with it an encoder 224*a–d* which operates to convert a measurement of the monitored quantity into a data signal suitable for transmission to and receipt by the transmitter section of data set 14. Of course, the data set 14 may be identical to the one described above, with reference to FIG. 1.

In this embodiment, each encoder 224*a–d* employs a set of switches 225*a–d*, a fixed combination of said set of switches being closed by the encoders 224*a–d* in response to the quantities measured by the monitoring devices 222*a–d*. One side of each switch in switch sets 225*a–d* is connected to a corresponding terminal 201*a–j* of the transmitter section of data set 14. The other side of each switch in switch sets 225*a–d* is connected in three groups to lines 206*a–d*, each of which lines is connected in series with the emitter-collector path of a transistor 208*a–l*. The emitters of all transistors 208*a–l* are connected together to a common line 219 which, in turn, is connected to common terminal 202 of the data set 14.

The data set 14 operates in a well known manner to produce a variable frequency output signal on line 11 to central station 10 dependent on which of the terminals 201*a–j* are shorted to common terminal 202. It can therefore be seen that if, for example, switch 218*a* of switch set 225*a* were closed, and transistor 208*a* were turned on, data set terminal 201*a* would be shorted through the path comprising line 227*a*, switch 218*a*, emitter to collector path of transistor 208*a*, and common line 219 to common terminal 202.

FIG. 3 further shows a plurality of AND gates 250*a–l* which in this embodiment are connected in groups of three. The output of each of the AND gates 250*a–l* is connected to a base of a corresponding transistor 208*a–l*. In the disclosed embodiment, each AND gate 250*a–l* is provided with a plurality of input terminals. When a proper signal, such as a positive signal, appears at each input terminal of an AND gate 250*a–l*, the AND gate will turn on and a positive signal will appear at the output terminal of the AND gate sufficient to switch the corresponding transistor 208*a–l* into a conductive state. The occurrence of at least one negative signal at an input terminal of an AND gate 250*a–l* will cause that AND gate to be turned off.

A plurality of flip-flops 260*a*, 260*b* and 260*c* shown in FIG. 3, each have an input terminal and a pair of complementary output terminals although only one output terminal is employed from flip-flop 260*a*. As is well known in the art, upon receiving a signal at an input terminal a flip-flop 260*a–c* will reverse the polarity of the output on the complementary output terminals. For example, clamping input terminal D of flip-flop 260*a* to common line, such as line 52 of FIG. 2, with the first complementary output terminal having a positive signal and the second complementary output terminal having a negative signal, will cause the first complementary output terminal to switch to a negative signal and the second complementary output terminal to switch to a positive signal.

Each of the flip-flops 260*a–c* shown in FIG. 3 is connected to an enabling terminal C, which is the same as enabling terminal C in FIG. 2. As is known in the art, if enabling terminal C is clamped to a common line, while the B+ from supply terminal A (of FIG. 2) is first applied, the flip-flops 260*a–c* will be clamped to a predetermined output state. In examining FIG. 3, it should be understood that the enabling terminals C of flip-flops 260*a–c* are connected to enabling terminal C of FIG. 2, and input terminal D of flip-flop 260*a* is connected to clock output terminal D of FIG. 2.

The output terminals of the flip-flops 260*a–b* are connected to selected input terminals of flip-flops 260*b–c* and the output terminals of flip-flops 260*a–c* are connected to selected input terminals of AND gates 250*a–l* in the manner illustrated in FIG. 3. The illustrated connections are made such that after all the flip-flops 260*a–c* are initially set to the predetermined output state, all of the AND gates 250*a–l* will receive at least one negative input signal and therefore all of the AND gates 250*a–l* will initially be in an off state. Further, after the clamp is released from enabling terminal C, a first negative input pulse at input terminal D of flip-flop 260*a*, will cause AND gates 250*a–c* to turn on and the remaining AND gates 250*d–l* to remain off. The next negative pulse at terminal D will cause all AND gates 250*a–l* to once again return to an OFF condition. Succeeding pulses at input terminal D cause AND gates 250*a–l* to continue to alternate between a reset condition wherein all gates are "off," and an "on" condition wherein a group of these gates are turned on.

In operation, a request signal is sent from data set receiver section 16 to relay winding 40 of FIG. 2 to close switch 42 thereby providing a positive voltage from supply 44 to bus bars 46*a* and 46*b* with respect to common line 52. Once switch 42 is closed, a positive voltage signal appears at supply terminal A of bus bar 46*b* which voltage is used as a B+ power source for the electronic scanner 26. The physical connection of the B+ to the electronic scanner is not shown in any of the diagrams to avoid unnecessary cluttering of the diagrams, but any conventional connecting means may be used to effect such a connection. When the supply voltage 44 is first applied to bus bars 46*a* and 46*b*, transistor 66 is biased by resistors 62, 68 and 76 into a nonconductive state and the voltage at enabling terminal C is held to that at the common line 52. With the switch 42 closed, the voltage at junction tie point B between resistor 48 and capacitor 50 begins to rise until it reaches a point at which gate 54 of SCR 56 is biased sufficiently positive to turn SCR 56 on. As SCR 56 turns on, transistor 66 switches to a conductive state thereby driving enabling terminal C to a positive potential.

The initial positive potential at supply terminal A causes the counter means 230, shown in FIG. 3 to be set at a first predetermined state as was explained above in greater detail. The initial clamping of enabling terminal C to common line 52 causes the counter 230 to be held in that predetermined state. When transistor 66 is turned on, causing a positive potential to appear at enabling terminal C, the counter 230 is free to respond to an input series of pulses generated by clock unit 36 at clock terminal D.

When transistor 66 first turns on, clock terminal D is at a positive potential since unijunction transistor 84 and transistor 96 are biased to initially be in nonconducting states. As transistor 66 turns on, the voltage across capacitor 82 begins to rise until it is sufficient to switch unijunction transistor 84 to a conductive state. As unijunction transistor 84 turns conductive, the voltage across resistor 94 rises, turning transistor 96 "on" thereby coupling collector 100 of transistor 96 and clock output terminal D to common line 52. A short time later the voltage across capacitor 82 has discharged through emitter 90, second base 88 of unijunction transistor 84, and resistor 94 to a value such that unijunction transistor 84 again goes into a nonconductive state, turning off transistor 96, and causing the potential at clock output terminal D to once again return to its previous positive value. It can therefore be seen that the clock output terminal D alternately varies between positive and common potential forming a series of output pulses.

At the time an initial pulse appears at the input terminal D of flip-flop 260*a* from clock unit 36 after flip-flop 260*a–c* have first been set to a predetermined state and the common clamp of enabling terminal C has been released as described above, at least one input terminal of each AND gate 250*a–l* has a negative signal applied to it by inverter 240 and all of the gates 250*a–l* are turned off. Consequently, initially all transistors 208*a–l* are in a nonconductive state. Upon application of the next input pulse to terminal D of flip-flop 260*a*, a positive signal appears at all of the input leads of AND gates 250*a–c*, thereby turning on AND gates 250*a–c* and also turning on associated transistors 208*a–c*. With transistors 208*a–c* turned on, lines 206*a* are connected to common line 219 of data set 14 through the conducting emitter-collector paths of transistors 208*a–c*. As a result, those data terminals 201*a–j*, of data set 14, are shorted to common, terminal 202, which have a closed corresponding switch in switch set 225*a* of encoder 224*a*.

The next input pulse to terminal D of flip-flop 260*a* from clock unit 36 once again causes a negative signal to appear on at least one input terminal of each AND gate 250*a–l* thereby again setting all transistors 208*a–l* into a nonconductive state and causing all data set terminals 201*a–j* to be open. The next pulse into terminal D of flip-flop 260*a* from clock unit 36 causes the AND gates 250*d–f* to all receive a positive signal at each of their respective input terminals thereby turning gates 250*d–f* on and causing transistors 208*d–f* connected thereto to go to a conductive state. As a result, switches 225*b* of encoder 224*b* are connected between respective terminals 201*a–j* and common terminal 202 of data set 14. This procedure continues until all of the encoders 224*a–d* have been connected, one at a time, to data terminals 201*a–j*.

It can therefore readily be seen that a single request signal from a central station 10 applied to relay coil 40 in FIG. 2 by the receiver section 16 of data set 14 will cause a positive B+ to appear at flip-flops 260*a–c*, at the same time enabling terminal C is held clamped to common line 52. This causes all flip-flops 260*a–c* to be clamped initially to a predetermined state. Once transistor 66 has turned on a described above, the common clamp on enabling terminal C is released and the counter means 230 is free to receive input pulses from clock output terminal D and thereby automatically and sequentially connect each encoder 224*a–d* one at a time to data set terminal pairs 204*a–j*. The reset function of reset unit 34 is therefore accomplished automatically upon receipt of a request signal from central station 10 to assure that a particular encoder such as encoder 224*a* will always be the first encoder connected by the electronic scanner 26 to the data set 14. This also assures that the encoders 224*a–d* will be connected to data set 14 in a predetermined order.

Alternate embodiment of counter and gates

Figure 4:
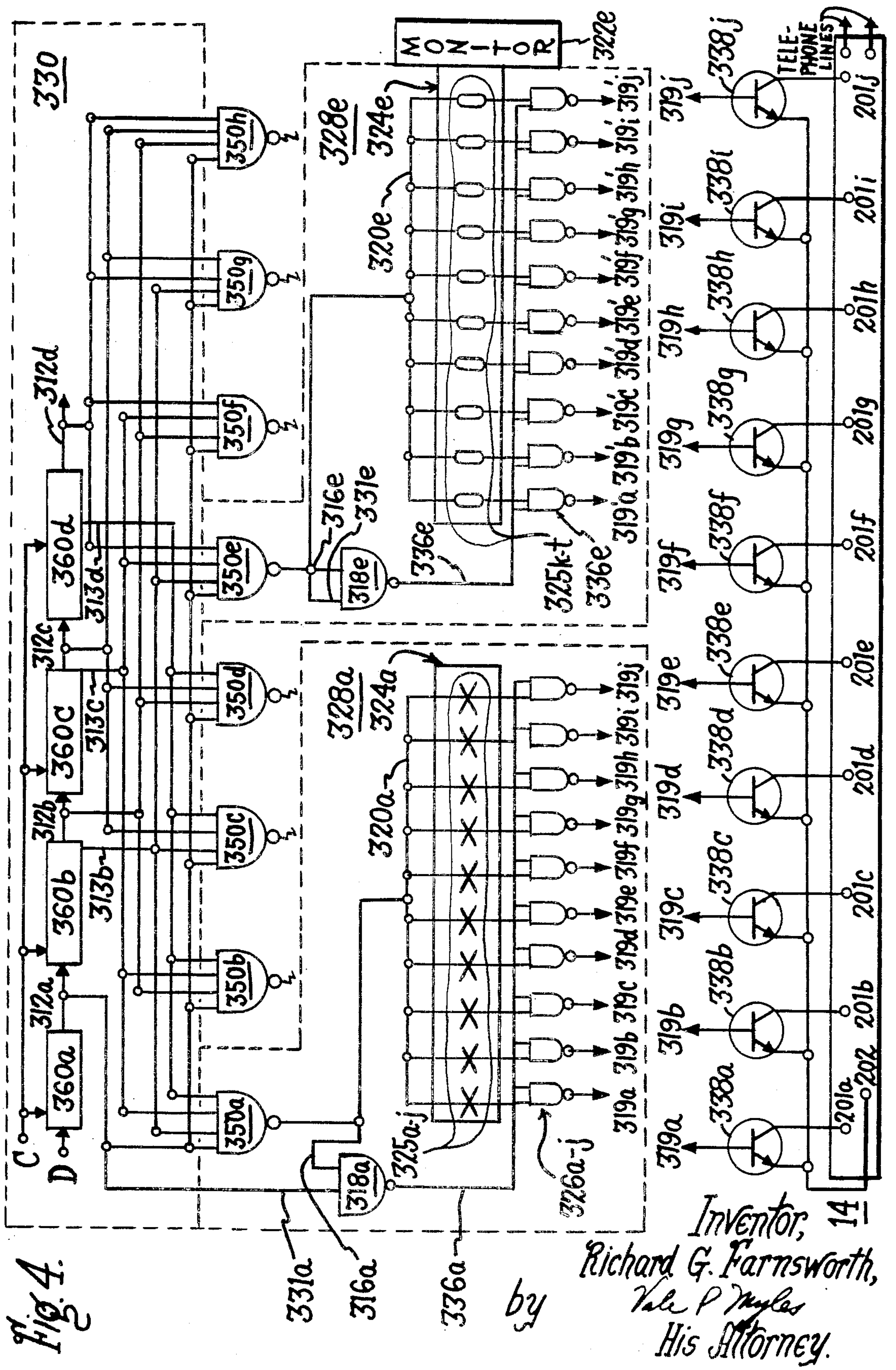
FIG. 4 is a schematic diagram of an alternate embodiment of a counter and gate for an electronic scanner constructed pursuant to the invention.

FIG. 4 is a diagram of the counter means and gates of an electronic scanner of the present invention employed in an alternate embodiment which also utilizes the reset unit 34 and the clock unit 36 of FIG. 2. This embodiment is similar to the first embodiment described above in that the electronic scanner employs a counter 330 whose output signals selectively control a plurality of gates 328*a–h*. In FIG. 4, only gates 328*a* and 328*e* are shown in order to avoid having an unnecessarily complex diagram. This embodiment differs from the previous embodiment primarily in that the gates 328*a–h* do not form a portion of a short circuit across terminals 201*a–j* and 202 of a data set 14, but rather transmit gating signals to a plurality of transistors 338*a–j* whose emitter-collector path provides a short circuit across the data set terminals 201*a–j* and 202 when an associated transistor is conducting as a result of receiving the gating signals from gates 328*a–h*.

In particular, FIG. 4 shows the counter means 330 and gating means 328*a–h* of the electronic scanner of the present invention. In this embodiment, the electronic scanner employs a plurality of flip-flops 360*a–d*, similar to flip-flops 260*a–c* of FIG. 3, having enabling terminals C, which are connected to enabling terminal C of FIG. 2. The first flip-flop 360*a* has input terminal D connected to clock output terminal D of FIG. 2. Each of the flip-flops 360*a–d* further has a respective first complementary output terminal 312*a–d* and a respective second complementary output terminal 313*b–d*, on respective flip-flops 360*b–d*. The cemplementary output terminals 312*a–d* and 313*b–d* are connected to input terminals of the various flips-flops 360*b–d* and to input terminals of NAND gates 350*a–h* in a manner known in the art so that as input pulses are applied to input terminal D of flip-flop 360*a*, NAND gates 350*a–h* alternate between a reset condition wherein all the gates 350*a–h* are turned on, and a condition wherein a predetermined one of said NAND gates 350*a–h* is turned off.

In FIG. 4, four flip-flops are shown and each of NAND gates 350*a–h* has four input terminals. It is noted, however, that to practice the invention, the number of flip-flops is not deemed to be limited to four nor is the number of input gate terminals limited to four.

A NAND gate in this embodiment is defined as a device which exhibits a positive signal at its output terminal when at least one of the input terminals receives a negative signal. This condition is referred to as an on condition of the NAND gate. When all the input terminals to a NAND gate receive a positive signal, or when all of the terminals to a NAND gate are in an open condition, or when all of the terminals of the NAND gate receive either a positive signal or are in an open condition, the gate is considered in an off condition and exhibits a negative signal at its output terminal.

It is to be understood that each NAND gate 350*a–h* is associated with a gating device, but that to avoid confusion, only gating devices 328*a* to 328*e* are shown in detail. Gating device 328*a* comprises a NAND gate 350*a* having input terminals connected to various complementary output terminals of flip-flops 360*a–d*. NAND gate 350*a* further has an output terminal which is connected to input terminal 316*a* of NAND gate 318*a*, and the output terminal is also connected to bus bar 320*a*. A plurality of switches 325*a–j* are provided with one side of each switch connected to bus bar 320*a*. The other side of each switch 325*a–j* is connected to an input terminal of a respective NAND gate 326*a–j*. A second input terminal of each NAND gate 326*a–j* is connected to common bus bar 336*a* which, in turn, is connected to the output terminal of NAND gate 318*a*. The other input terminal 331 of NAND gate 318*a* is connected to first complementary output terminal 312*a* of flip-flop 360*a*.

Gating means 328*e* is basically similar to gating means 328*a*. Gating means 328*e* employs a NAND gate 350*e* whose output is connected to bus bar 320*e* and an input terminal 316*e* of NAND gate 318*e*. Gating means 328*e* also comprises a plurality of switches 325*k–t*, the first side of each switch 325*k–t* being connected to bus bar 320*e* and the second side of each switch 325*k–t* being connected to a first input terminal of NAND gate 326*k–t*. The second input terminal of each NAND gate 326*k–t* is connected to bus bar 336*e* which is in turn connected to the output terminal of NAND gate 318*e*. The second input terminal 331*e* of NAND gate 318*e* is connected to terminal 316*e*.

Data set 14 is shown having a plurality of input terminals 201*a–j*. Terminal 202 is the common terminal of data set 14. FIG. 4 further shows a plurality of transistors 338*a–j* with one transistor corresponding to each terminal 201*a–j*. Each terminal 201*a–j* is connected to a collector of an associated transistor 338*a–j*. The emitters of all transistors 338*a–j* are connected together to common line 314 which is connected to data set common 14. It can therefore be seen that each transistor 338*a–j* is connected in an open collector configuration to a respective terminal 201*a–j* of data set 14 such that should a gating signal be applied to the base of a transistor 338*a–j* turning that transistor on, a short would occur between the respective terminal 201*a–j* and common terminal 202 through the collector-emitter path of that conducting transistor. The base of each transistor 338*a–j* is connected to an output 319*a–j* of NAND gates 326*a–j* and is also connected to a respective output 319*a'–j'* of NAND gate 326*k–t*. In order to avoid unnecessary clutter of FIG. 4, the electrical connection between the bases of transistors 338*a–j* and outputs 319*a–j* and 319*a'–j'* is not shown.

In the particular embodiment shown in FIG. 4, the switches 325*k–t* are employed in an encoder 324*e* which may be similar to encoders 224*a–d* shown in FIG. 3. Encoder 324*e* is employed to close selective combinations of switches 325*k–t* in order to provide a representation of the quantity monitored by monitoring means 322*e*.

Identification means may be employed in substitution of encoders in any of the disclosed embodiments. For example, the gating device 328*a* employs an identification means 324*a* which is provided with switches 325*a–j*. In the identification means, selective switches 325*a–j* are held open in a known combination to cause a unique identification signal to be transmitted by the transmitter section of data set 14 when the particular gating device 328*a* associated with the identification unit 324*a* is activated by the counting means 330. More than one identification unit may be employed in each electronic scanner of the present invention to increase the number of unique identification signals available.

In operation, B+ is applied to flip-flops 360*a–d* while enabling terminal C is held clamped to common line 52 as described above with respect to FIG. 3. This causes each of the flip-flops 360*a–d* to be set in a predetermined manner such that at least one input terminal of each NAND gate 350*a–h* receives a negative signal and therefore each NAND gate 350*a–h* will be initially in an on condition. After the common line clamping at enabling terminal C is removed by reset unit 34 as described above and clock pulses from clock unit 36 are applied to input terminal D of flip-flop 360*a*, the counter means 330 operates to alternate between a rest period wherein all of NAND gates 350*a–h* are in an on condition and a data gathering period wherein one of NAND gates 350*a–h* is in an off condition. Setting flip-flops 360*a–d* initially to a predetermined condition assures that once clocking pulses are applied to input terminal D, a preselected first gate such as NAND gate 350*a* will always be the first gate to be turned to an off condition. This further assures that the gates 350*a–h* will be turned to an off condition in a predetermined sequence.

During a rest period, all of NAND gates 350*a–h* receive at least one negative signal at an input terminal from flip-flop 360*a*, terminal 312*a*, and are therefore in an on condition, causing a positive signal from the output of NAND gate 350*a* to appear at input terminal 316*a* of NAND gate 318*a*. In addition, a negative signal is applied to input terminal 331*a* of NAND gate 318*a* from complementary output terminal 312*a* of flip-flop 360*a*. This negative signal appearing at the input terminals of NAND gate 318*a* causes NAND gate 318*a* to be in an on condition generating a positive signal at its output terminal connected to bus bar 336*a*. Therefore, a positive signal appears at one input terminal of each NAND gate 326*a–j* connected to bus bar 326*a*. In addition, a second input terminal of each NAND gate 326*a–j* also has a positive signal applied to it; either by having a second input terminal connected to an open switch 325*a–j*. the open switch acting as a positive input signal, or by having a second input terminal connected to a closed switch 325*a–j* which enables a positive signal from the output terminal of NAND gate 350*a* to be applied directly to the second input terminal through bus bar 320*a* and closed switches 325*a–j*. Therefore, all of the NAND gates 326*a–j* have positive signals appearing at both of their input terminals causing all of NAND gates 326*a–j* to be in an off condition during a rest period. When all NAND gates 326*a–j* are turned off during a rest period, negative signals appear at each of their output terminals 319*a–j*. These output signals are applied to the bases of transistor 338*a–j* and the signals are equivalent to grounding the bases of all transistors 338*a–j* to be held in a non-conductive condition during a rest period thereby opening all data terminals 201*a–j* of data set 14.

After the initial rest condition described above, a first clocking pulse is applied to input terminal D of flip-flop 360*a* from clock unit 36. The resulting output signals from flip-flops 360*a–d* cause NAND gate 350*a* to be turned off while the remaining NAND gates 350*b–h* stay in an on condition. With NAND gate 350*a* turned off, a negative signal appears at its output. The negative signal is applied to input terminal 316*a* of NAND gate 318*a* and the negative signal is also applied to common bus bar 320*a*. NAND gate 318*a*, receiving a negative input signal from NAND gate 350*a*, turns on causing a positive signal to appear at its output terminal thereby applying a positive signal through bus bar 336*a* to one input terminal of NAND gates 326*a–j*. Those NAND gates 326*a–j* having a second input terminal connected to an open switch 325*a–j* of identification unit 324*a* will in effect have two positive input signals and therefore will be held in the off condition with a resulting negative output signal at the respective output terminal 319*a–j*, as was the case for all terminals 319*a–j* during the rest period. However, the second input terminals of NAND gates 326*a–j* connected to switches 325*a–j* which are closed, receive a negative signal from bus lines 320*a* and thereby turn their respective NAND gates 326*a*–j on causing a positive signal to appear at their respective output terminals 326*a–j*. For example, if swiches 325*a*, 325*d* and 325*j* were closed, NAND gates 326*a*, 326*d* and 326*j* would be turned on and cause respective transistors 338*a*, 338*d* and 338*j* connected to said NAND gates to also be in a conductive condition and short their respective terminals 201*a*, 201*d* and 201*j* to common terminal 202. The remaining transistors 338*b, c, e, f, g, h,* and *i* would continue to be held in a nonconducting off condition as they were during the rest period.

It should be noted that while NAND gate 350*a* is turned off, the remaining NAND gates 350*b–h* have been held in an on condition which results in positive signals appearing at their respective output terminals. This positive signal, as shown in FIG. 4, for NAND gate 350*e* of gating device 328*e*, is applied to an input terminal 316*e* of NAND gate 318*e*, causing NAND gate 318*e* to be in an off condition and a negative output signal appears at bus line 336*e*. The negative signal at bus line 336*e* assures that all NAND gates 326*k–t* will receive at least one negative signal at an input terminal and therefore will be in an on condition. In the on condition, NAND gates 326*k–t* cause a positive or open signal to appear at their respective output terminals 319*a′–j′* which in turn are connected to a base of an associated transistor 338*a–j*. Where NAND gates 326*k–t* act alone upon transistors 338*a–j*, all of transistors 338*a–j* would be turned to the conductive state. However, one NAND gate 350*a–h* is turned off during a data gathering period and as described above with respect to NAND gate 350*a*, this causes the NAND gates 326*a–j* associated with open switches 325*a–j* to be turned off thereby driving the associated transistor bases of transistors 338*a–j* to ground and overriding the positive signals received from other NAND gates 326*k–t*. The effect in general is to switch each transistor 338*a–j* associated with a closed switch 325*a–j* to a conductive state and to hold transistors 338*a–j* associated with open switches 325*a–k* in a nonconductive state. The effect is the same as in the first embodiment, i.e., selective terminals 201*a–j* of a data set 14 are shorted to common terminal 202 to represent a unique quantity registered in an identification unit or in an encoder.

The next input clock pulse to terminal D after a data gathering period causes all NAND gates 350*a–h* to return to their initial on condition and all transistors 338*a–j* will be turned off as is described above. Succeeding input pulses to input terminal D alternately cause a data gathering period during which a selected one of NAND gates 350*a–h* is turned off and rest periods during which all NAND gates 350*a–h* are turned on.

For example, after a particular rest period, a succeeding pulse to input terminal D will, for example, turn off NAND gate 350*e* causing a negative signal to appear at its output terminal. This negative signal is applied to input terminal 316*e* of NAND gate 318*e*. This negative signal to NAND gate 318*e* causes NAND gate 318*e* to be turned on and in turn results in a positive signal at bus bar 336*e* and at one input terminal of NAND gates 326*k–t*. The switches 325*k–t* which are open cause a positive signal to appear at the second input terminal of respective NAND gates 326*k–t* thereby turning those NAND gates off and resulting in a grounding of the bases of transistors 338*a–j* connected thereto. However, the NAND gates 326*k–t* whose associated switch 325*k–t* is closed, receive a negative input signal from NAND gates 350*e* through bus bar 320*e* and thereby are turned on resulting in a positive signal appearing at their output terminals. The positive signal at the respective output terminal of NAND gates 326*k–t* are communicated to the bases of transistors 338*a–j* causing the associated transistors 338*a–j* to be turned to a conductive state. As described above, when a respective transistor 338*a–j* is turned on, it causes the associated terminals 201*a–j* to be shorted to common terminal 202. The combination of shorted terminals at data set 14 results in a unique signal being transmitted to central station 10 representative of the quantity monitored by monitoring device 322*e*.

It will be understood that various changes may be made in details within the scope of my claims without departing from the spirit of my invention. It is therefore to be understood that my invention is not to be limited to the specific details shown and described.

What is claimed as new and desired to be secured by Letters Patent of the United States is:

1. An electronic scanner for connecting a plurality of data input means adapted to receive data signals representative of monitored quantities, one at a time, in a predetermined sequence, to data output means, said electronic scanner comprising:

a reset unit having an input means adapted to receive a request signal, said reset unit having output means and said reset unit generating first and second control signals at said output means responsive to said request signal;

a counter having first and second input terminals and a plurality of output terminals, said first input terminal being connected to said reset unit output means and said counter being adapted to be locked in a predetermined output state responsive to said first control signal from said reset unit output means;

a clock unit having an input connected to said reset unit output means and an output terminal connected to said second input terminal of said counter, said clock generating a series of pulses at said clock output terminal upon receiving said second control signal from said reset unit output means, said counter being released responsive to said second control signal, said counter generating a gating signal successively at each of said counter output terminals in response to said series of clock pulses; and gating means including inputs connected to said data input means, outputs connected to said data output means, and control means connected to said counter output terminals, said gating means, in response to said gating signals from said counter output terminals, being operable to communicate said data signals from said data input means, one at a time, to said data output means.

2. An invention as defined in claim 1 wherein said series of clock pulses causes said counter to generate a gating pulse only responsive to every other pulse, thereby to separate each gating signal by an interval equal, respectively, to the duration of one of said pulses.

3. An invention as defined in claim 1 wherein each of said gating means is substantially identical in structure, and wherein said gating means are all connected in a parallel mode to said data output means.

4. An invention as defined in claim 3 wherein each of said gating means comprises a modular assembly, whereby each gating means can be readily adjusted to adapt it for use with a plurality of different data input means.

5. An invention as defined in claim 1 wherein said first and second control signals generated by the reset unit are effective to automatically reset the counter to a predetermined state, thereby to assure that a given preselected data input means will always be the first to be placed in communication with the data output means by said gating means.

6. Any invention as defined in claim 1 wherein said reset unit, said counter, said clock unit, and said gating means are all de-energized until a request signal is received by said reset unit, whereby the scanner only consumes energy during the interval following a request signal until each of the gating means has been actuated, in sequence.

7. An invention as defined in claim 1 wherein said data input means includes at least one electric watt-hour meter connected through an encoder to one of said gating means, and wherein said data output means includes a code signal generator connected to a telephone line over which a code signal is fed responsive to one of said gating means being operated to place the encoder in communication with the code signal generator.

References Cited

UNITED STATES PATENTS

| | | | |
|---|---|---|---|
| 3,268,814 | 8/1966 | Du Vivier | 340—183 |
| 3,313,160 | 4/1967 | Goldman | 340—151 |
| 3,392,378 | 7/1968 | Perry | 340—204 |

JOHN W. CALDWELL, Primary Examiner

R. J. MOONEY, Assistant Examiner

U.S. Cl. X.R.

340—151, 163, 183, 204